Aug. 7, 1962   F. X. OBERPAUL   3,048,127
VEHICLE RUNNING GEAR

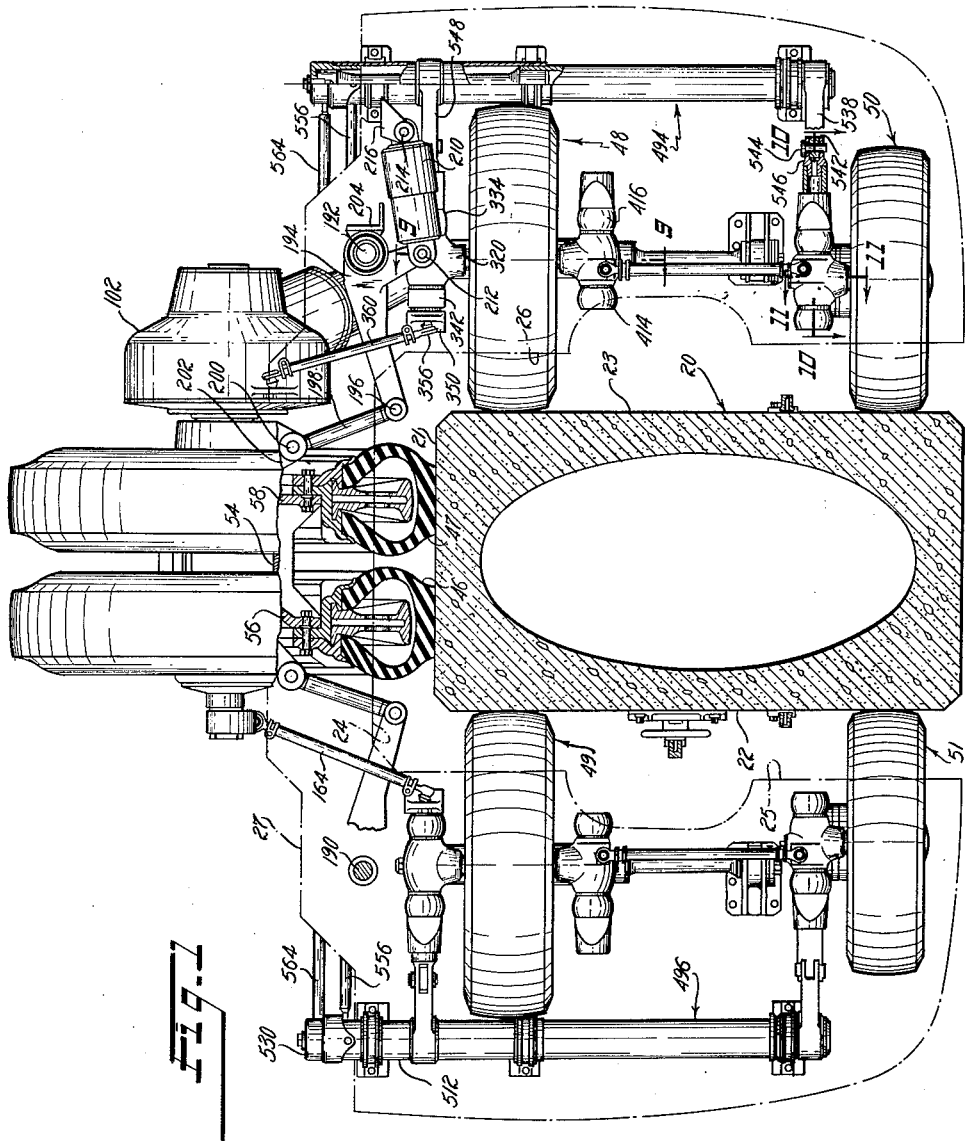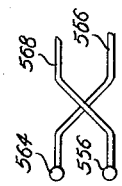

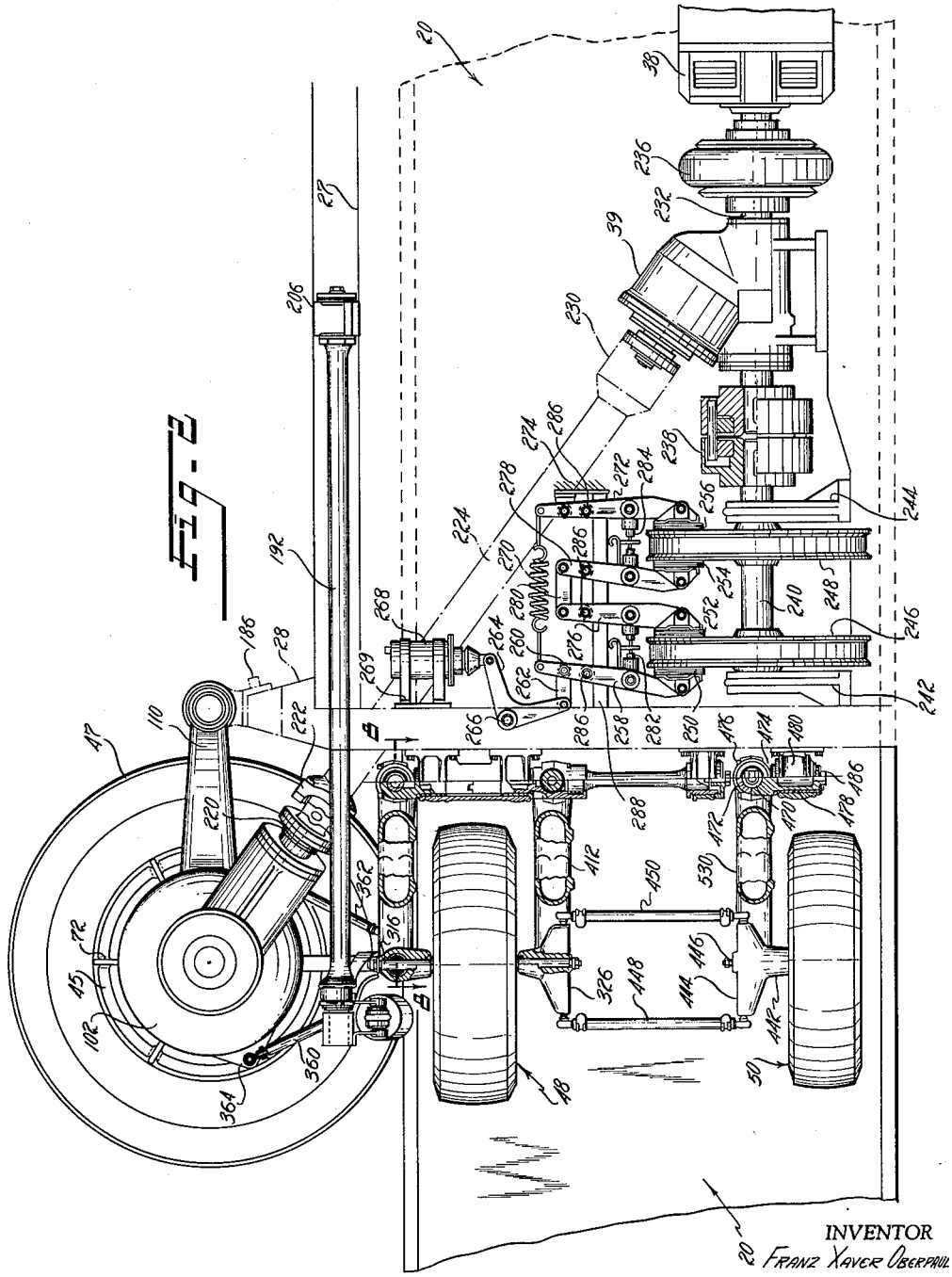

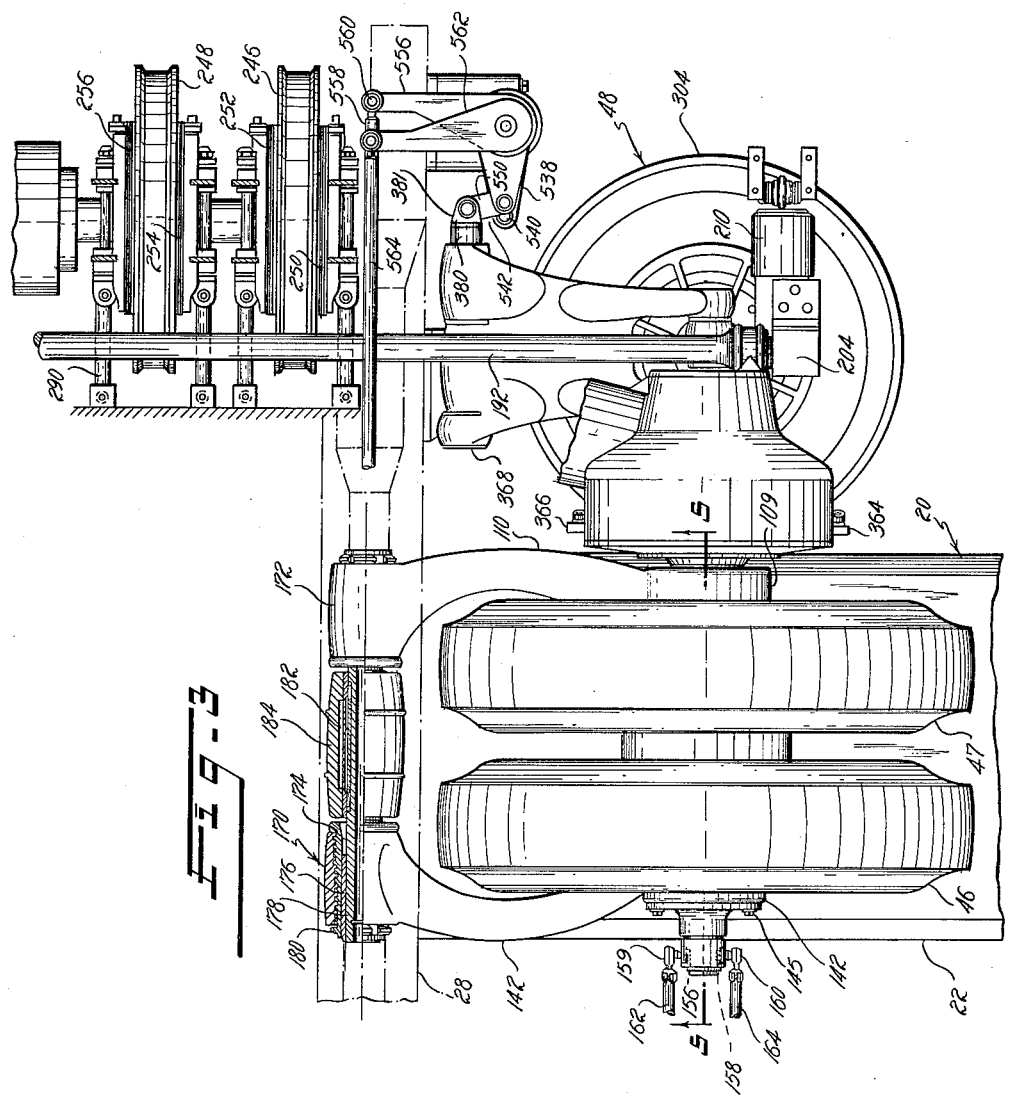

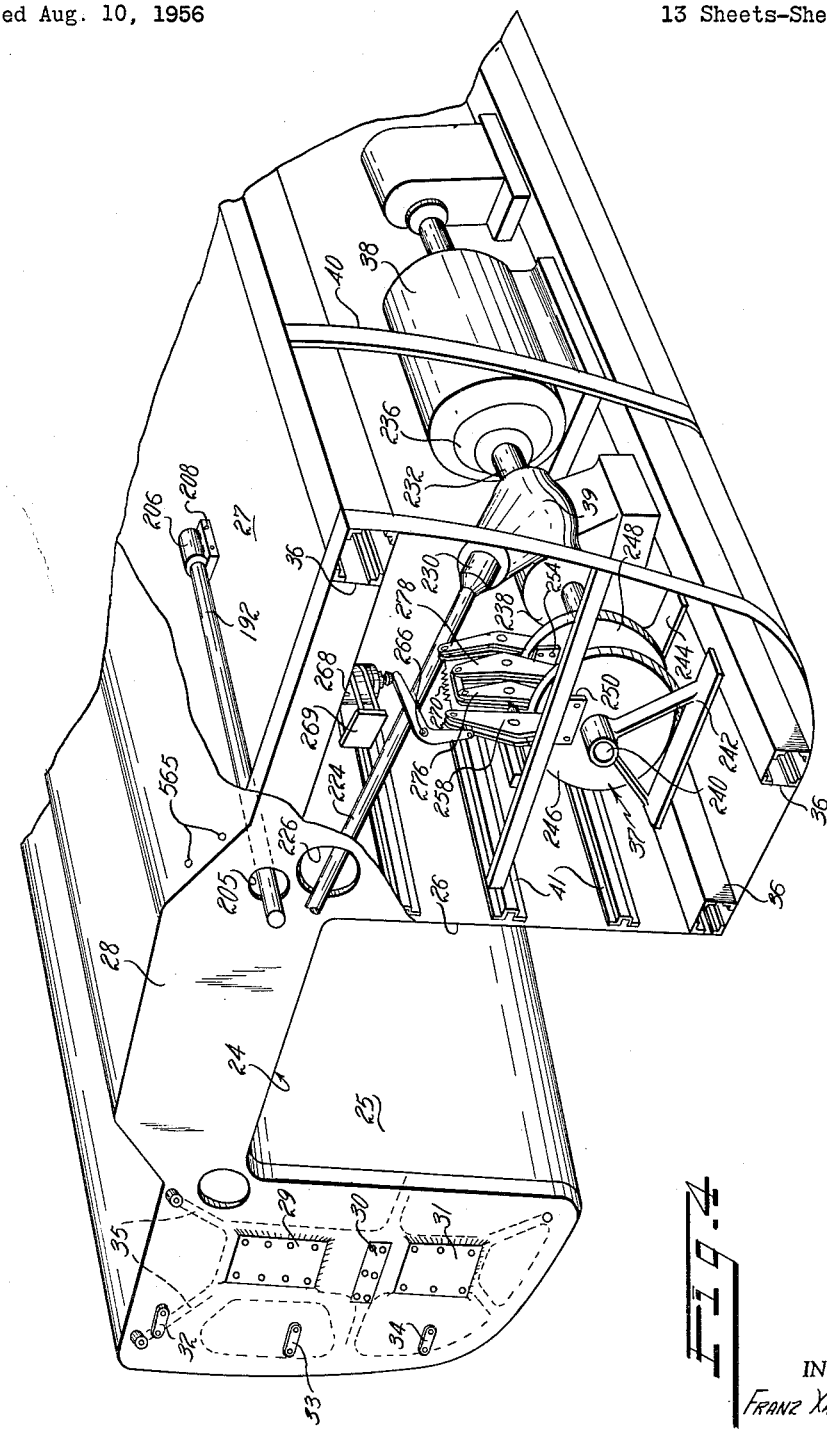

Filed Aug. 10, 1956   13 Sheets-Sheet 5

INVENTOR
FRANZ XAVER OBERPAUL

BY

ATTORNEYS

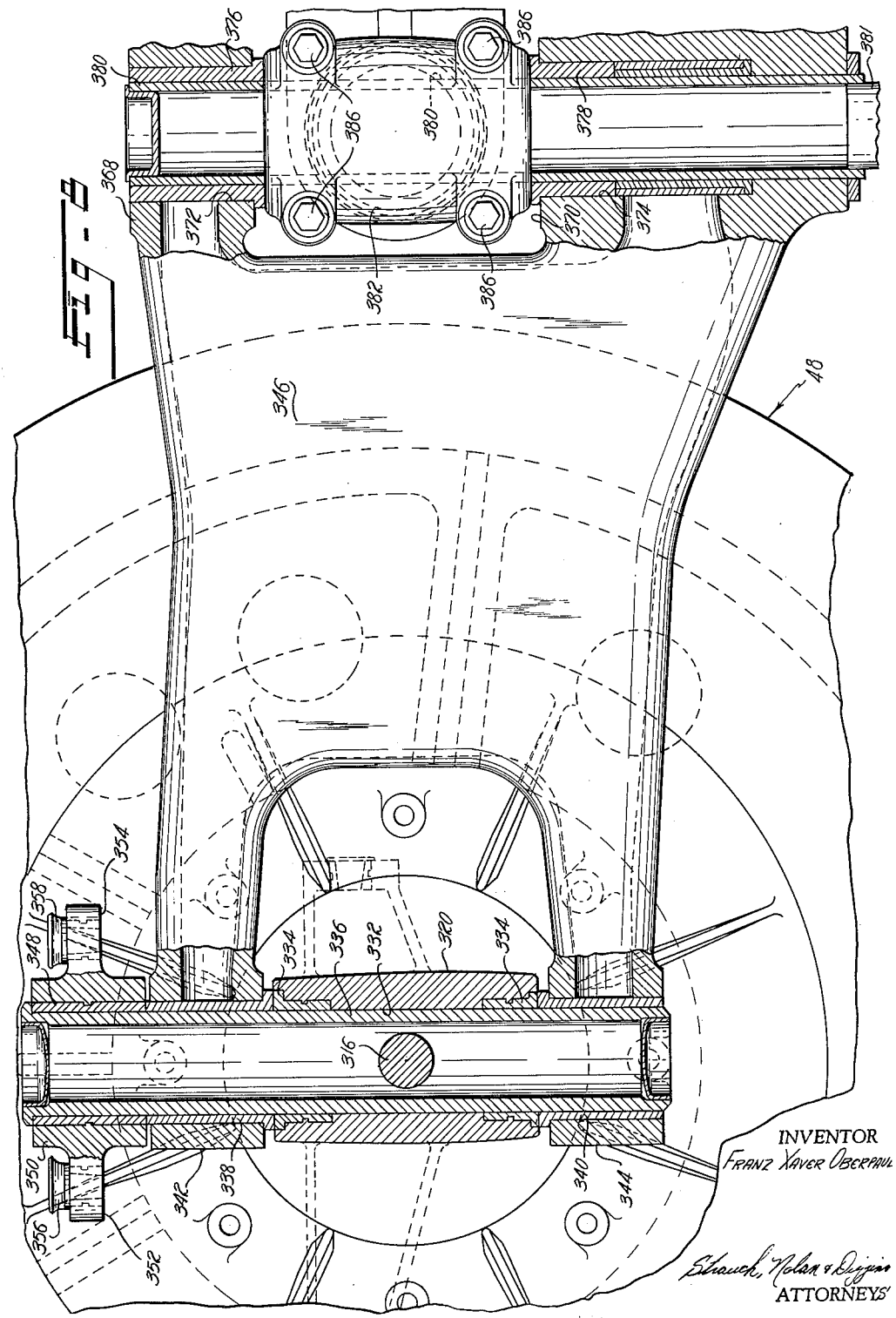

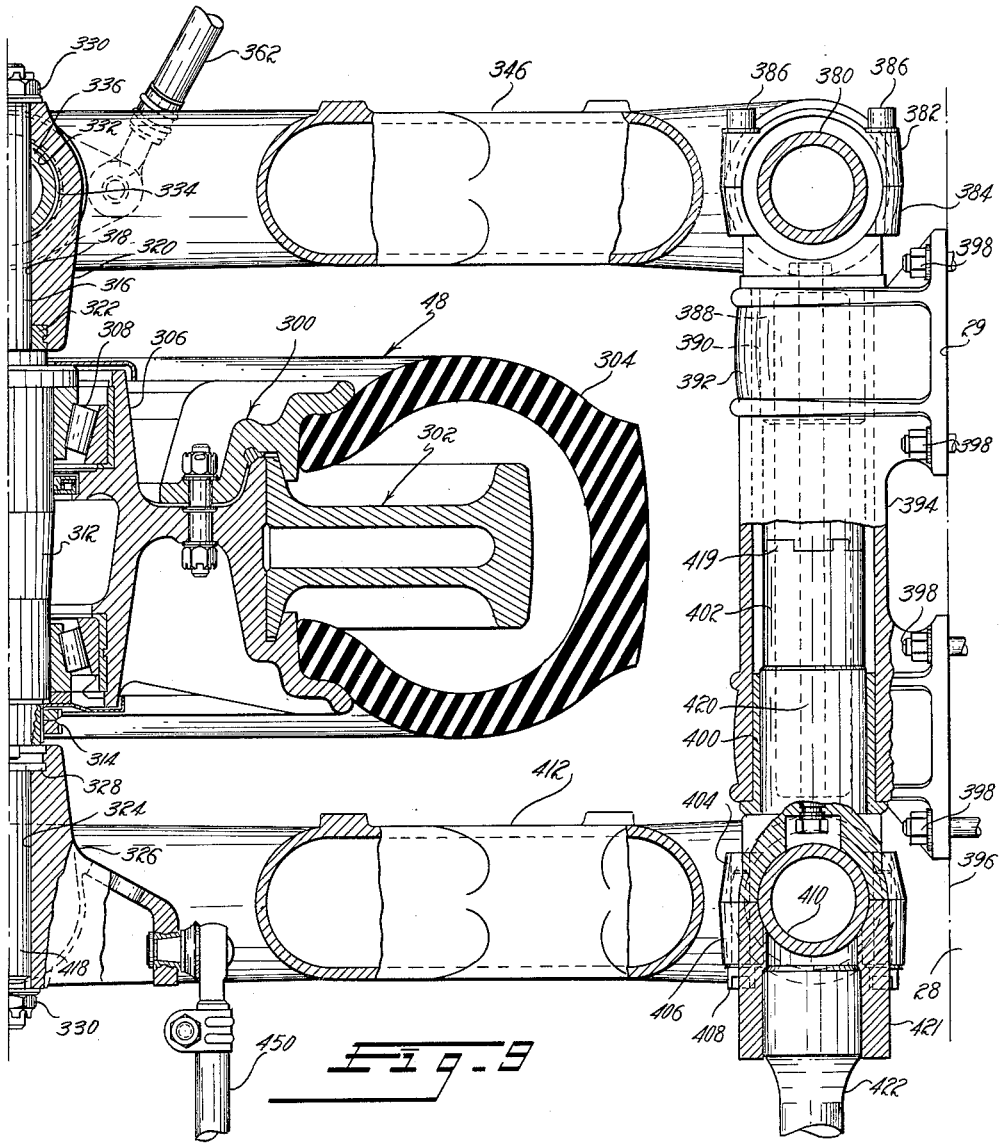

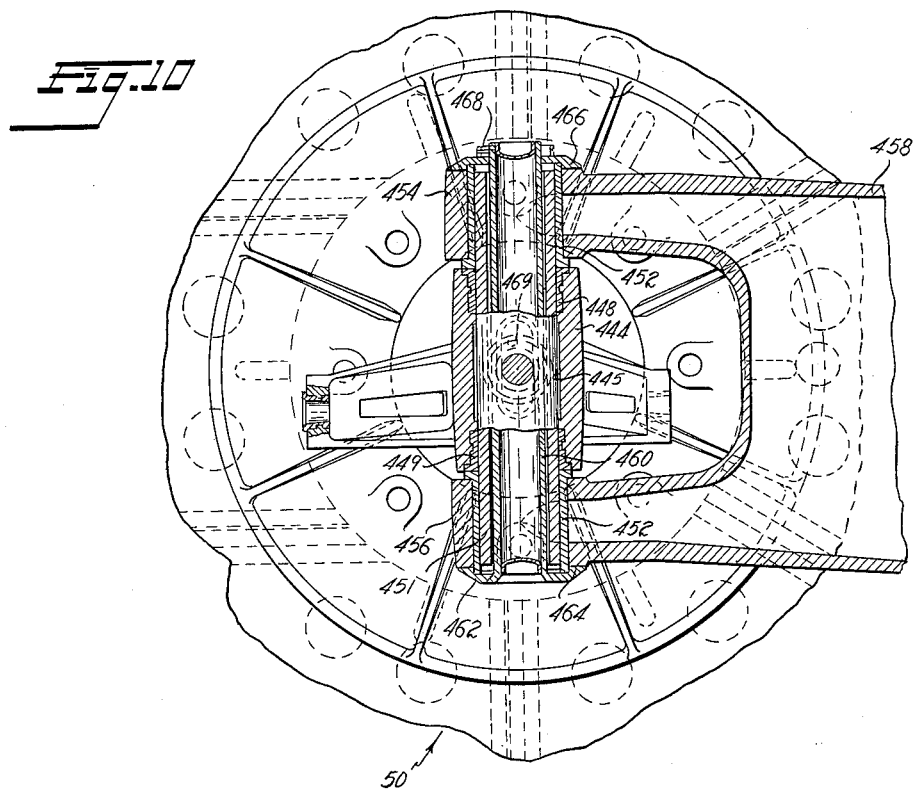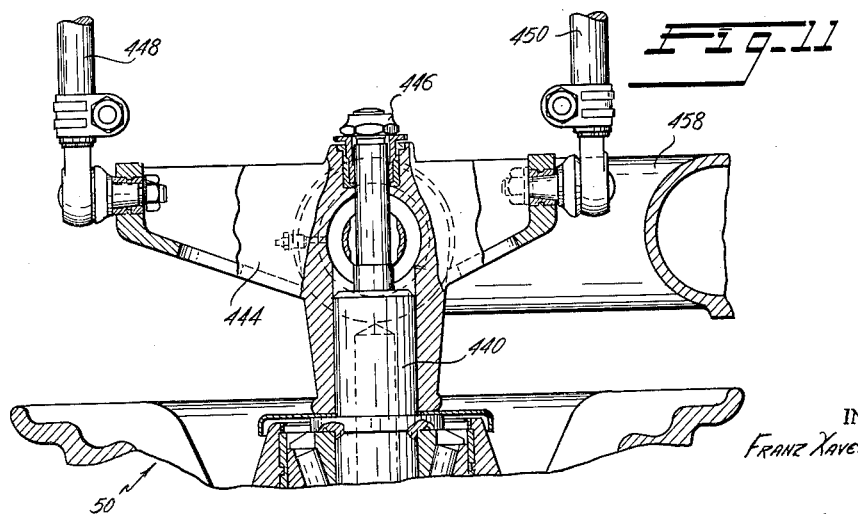

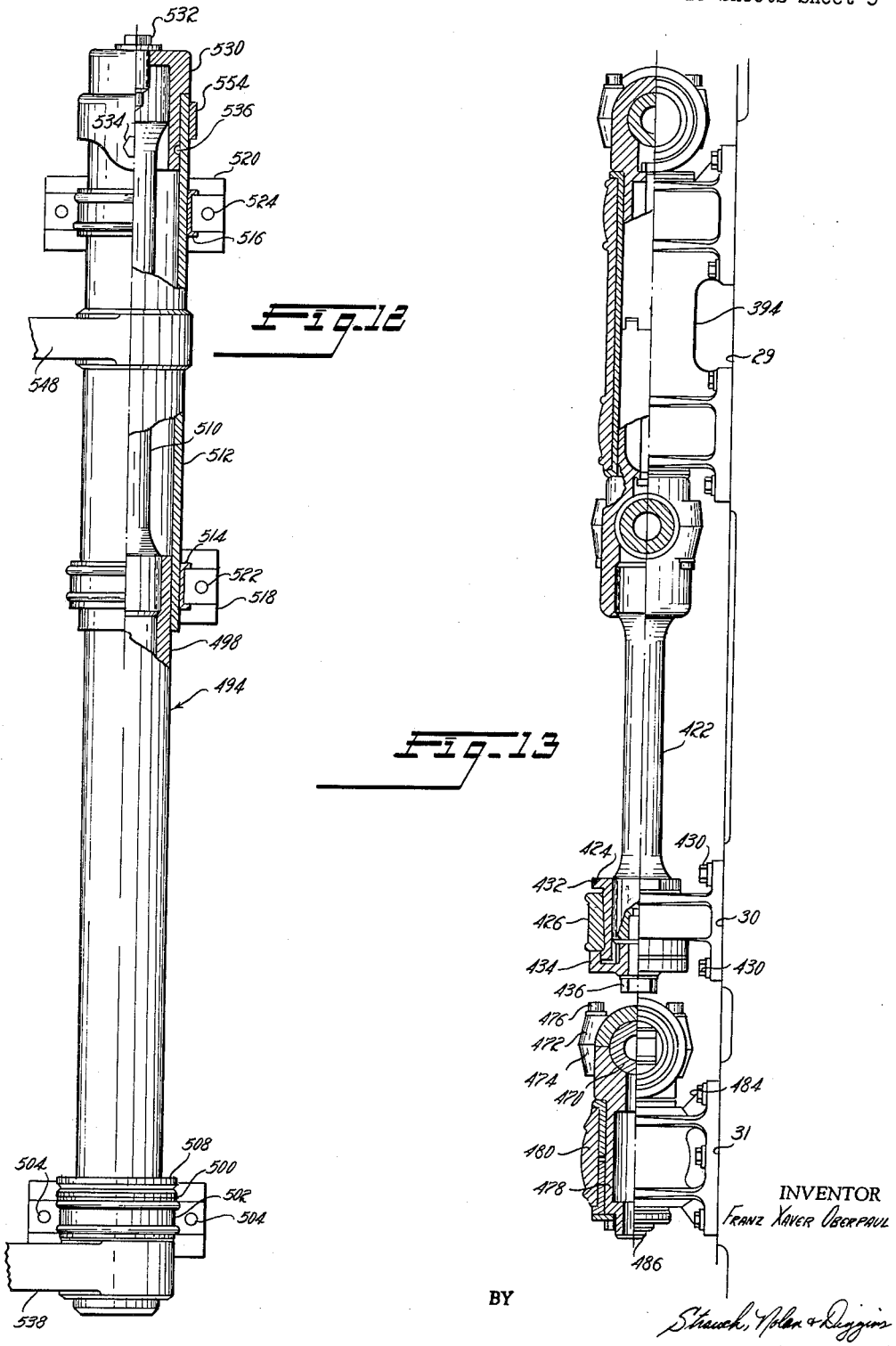

Aug. 7, 1962    F. X. OBERPAUL    3,048,127
VEHICLE RUNNING GEAR

Filed Aug. 10, 1956    13 Sheets-Sheet 10

INVENTOR
FRANZ XAVER OBERPAUL

BY
Strauch, Nolan & Neale

ATTORNEYS

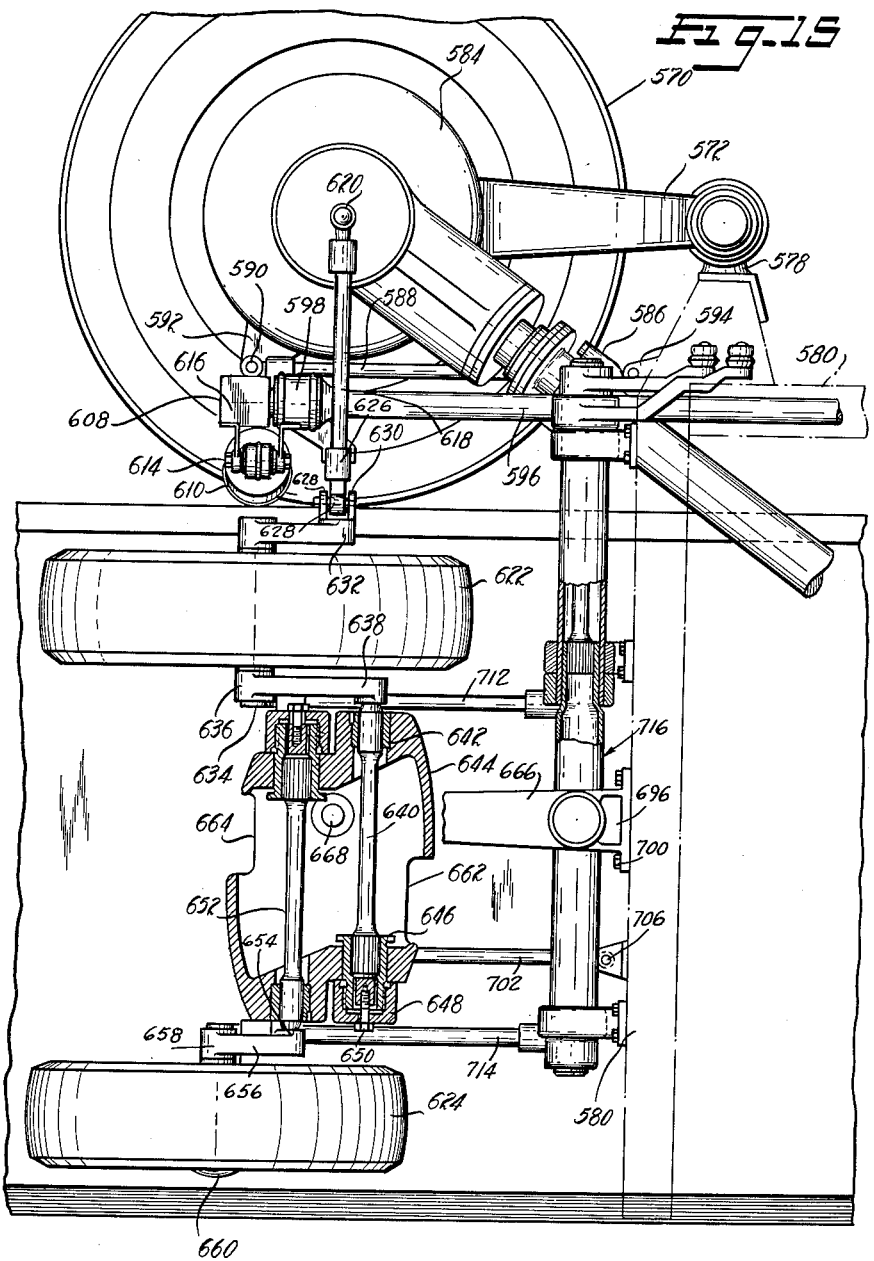

Aug. 7, 1962  F. X. OBERPAUL  3,048,127
VEHICLE RUNNING GEAR
Filed Aug. 10, 1956  13 Sheets—Sheet 12
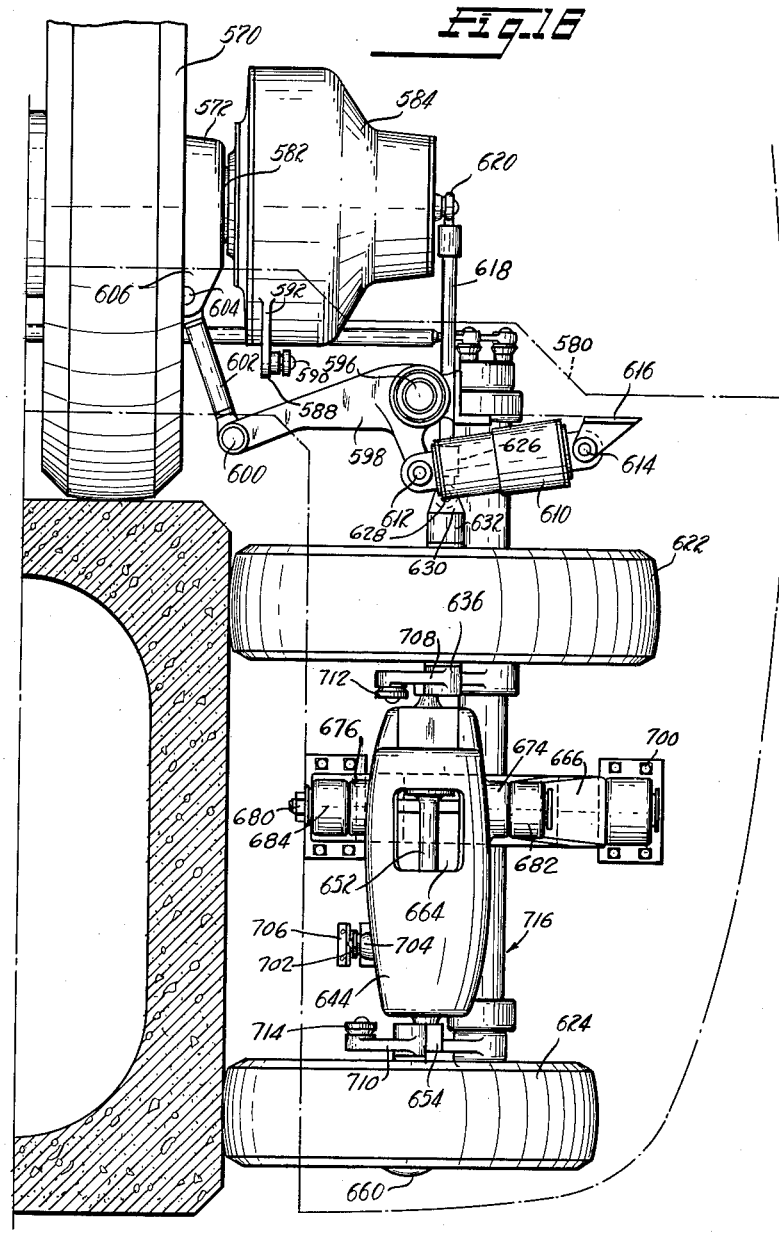
INVENTOR
FRANZ XAVER OBERPAUL
BY  *Strauch, Nolan & Neale*
ATTORNEYS

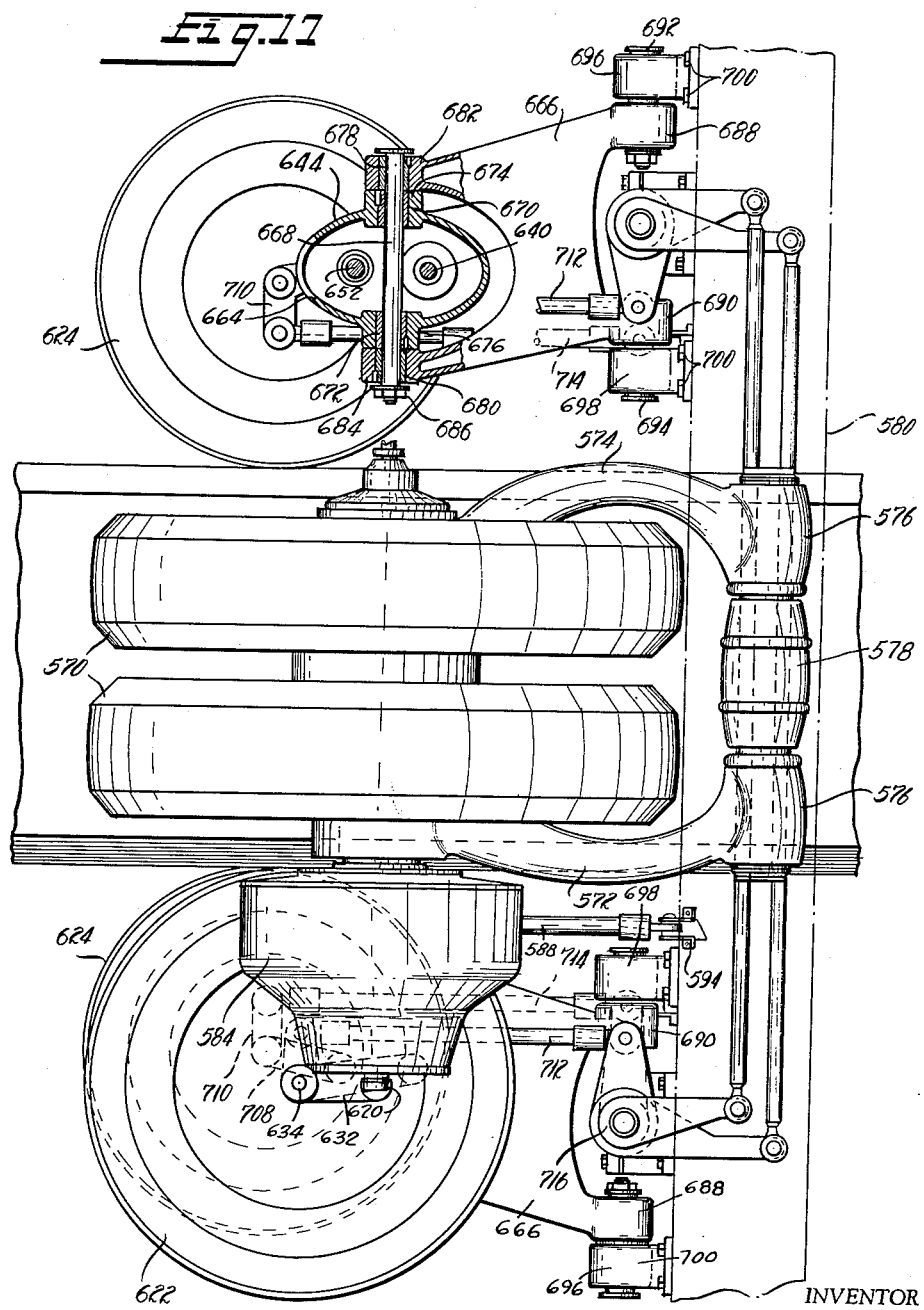

United States Patent Office 3,048,127
Patented Aug. 7, 1962

3,048,127
VEHICLE RUNNING GEAR
Franz X. Oberpaul, Koln, Germany, assignor to Alweg-Forschung, Gesellschaft mit beschränkter Haftung, Koln, Germany, a corporation of Germany
Filed Aug. 10, 1956, Ser. No. 603,389
Claims priority, application Germany Sept. 25, 1954
14 Claims. (Cl. 105—145)

This application is a continuation-in-part of application Serial No. 534,106, filed September 13, 1955, now abandoned.

This invention relates to vehicles and more particularly to running gear for monorail vehicles.

Such vehicles are adapted to ride over a track structure having horizontal and vertical rails or surfaces and are generally supported on chassis constructions which include one or more supporting or load carrying wheels which ride over the horizontal rail and guiding wheels which contact vertically disposed rails or surfaces, the former driving and carrying the weight of the vehicle and the latter guiding the vehicle and absorbing tilting moments. Generally one such chassis is pivotally secured at each end of the vehicle in essentially the same manner as the trucks for conventional two-rail railway cars.

In some cases it has been proposed to provide the load carrying wheels with single or double flanges to assist in guiding the vehicle. However, it has been found that such flanges produce high frictional loads and rapid wear of the wheels and rails and often impart poor riding qualities to the vehicle. In recognition of the disadvantages of flanged supporting wheels it has been proposed to eliminate these flanges and to effect the guiding function performed by these flanges by the use of separate guiding and tilt control wheels either above or below the center of gravity of the vehicle body. In the best of the known constructions of this type, supporting and guiding wheels are mounted in a chassis pivotally and resiliently connected to the car body. In order to provide effective guiding and stabilization of the vehicle it has been believed, prior to the present invention, that at least six side wheels are required in each such chassis. Since two chassis units are ordinarily required to support a car body, twelve such wheels are used in a single vehicle.

Accordingly the unsprung weight of the vehicle is relatively high, the rolling friction reaches objectionable levels, the cost of the units is high and the difficulties encountered in the replacement of individual components or the entire chassis are greatly magnified. Since in many cases the principal advantages of the monorail system are its light weight, low frictional resistance, and ease of maintenance, the use of such chassis units is self-defeating.

It is, accordingly, a primary purpose and object of the present invention to provide improved running gear constructions for monorail vehicles which overcome the above-stated disadvantages of known prior construction.

This primary object and additional objects are accomplished in the present invention by the provision of novel vehicle supporting structure which has improved performance characteristics and at the same time is of simplified, light weight construction. In accordance with the present invention the usual chassis unit is eliminated and the running gear comprises unflanged load carrying wheels or groups of wheels and two opposed pairs of side wheels which effectively guide the vehicle and absorb tilting forces. Each of the wheels is connected directly with a car body by means of a unique spring suspension system which transmits the loads acting on each of the wheels or wheel groups directly to the car body or to the other wheels or wheel groups. Preferably the spring system is constructed to provide a relatively soft ride and yet to firmly resist tilting or undue lateral movements. Further the suspension system of the side wheels is arranged to urge the side wheels against the beam surfaces or tracks with light pressure during travel along the straight or essentially straight sections of track but to produce strong forces in opposition to tilting or wavering movements of the vehicle. Also in accordance with the invention, portions of the suspension system for the opposite sets of side wheels are coupled through a torsion-stabilizing system. Preferably, the stabilizer coupling is so arranged that an upper guide wheel on one side is coupled with a lower wheel on the opposite side.

This stabilizer system of the present invention produces a surprising increase in passenger comfort and a more flexible selection of the strength and other characteristics of the wheel supporting springs to produce optimum support of the vehicle against lateral and tilting displacements. These results are achieved by a unique construction of the suspension system which effectively separates the springs resisting lateral movements from the springs resisting tilting movement thus permitting wide latitude in the selection of each set of springs to provide predetermined performance characteristics without affecting the performance of, or the riding characteristics imparted to the vehicle by, the other set of springs.

It is accordingly a further important object of the present invention to provide novel running gear for monorail vehicles and a novel spring suspension for the vehicle wheels and particularly the lateral wheels which provides a degree of riding comfort and a control of the lateral and tilting movements of the vehicle not heretofore obtainable.

According to a further feature of the invention the resilient resistance to movement of the side wheel away from the beam varies along a non-linear curve so that the side wheels are normally urged against the sides of the monorail beam with a minimum pressure but are urged against the side surfaces of the beam with a strongly increased pressure upon rotation of the car body relative to the supporting beam.

Accordingly it is a further important object of the present invention to provide novel running gear for monorail vehicles of relatively light weight and simple yet rugged construction which affords improved riding qualities, reduces running friction losses and reduces unsprung weight.

It is a further object of the invention to provide improved running gear for monorail vehicles which has an extended service life, which requires a minimum of maintenance, and which is so constructed as to facilitate performance of such maintenance, repair and replacement as may be required.

It is an additional object of the present invention to provide improved running gear for monorail vehicles which eliminates the usual relatively complex chassis construction and which supports the monorail vehicle resiliently on the wheels themselves by a novel spring suspension system.

Additional objects and advantages will become apparent as the description proceeds in connection with the accompanying drawings in which:

FIGURE 1 is a front elevation of a preferred form of the running gear of the present invention with a portion of the vehicle car body shown in phantom lines;

FIGURE 1A is a side elevation of a portion of the stabilizer system of FIGURE 1;

FIGURE 2 is a side elevation of the running gear of FIGURE 1 as viewed from the right side of FIGURE 1;

FIGURE 3 is a top plan view of a portion of the running gear shown in FIGURE 1;

FIGURE 4 is a fragmentary perspective view of the lower portion of the car body frame structure to which the running gear of FIGURE 1 is secured;

FIGURE 8 is an enlarged fragmentary section taken along line 8—8 of FIGURE 2 showing details of the construction of the upper side guide wheel mounting assembly;

FIGURE 9 is an enlarged fragmentary section taken along line 9—9 of FIGURE 1 also showing details of the upper side guide wheel mounting assembly;

Figure 14:
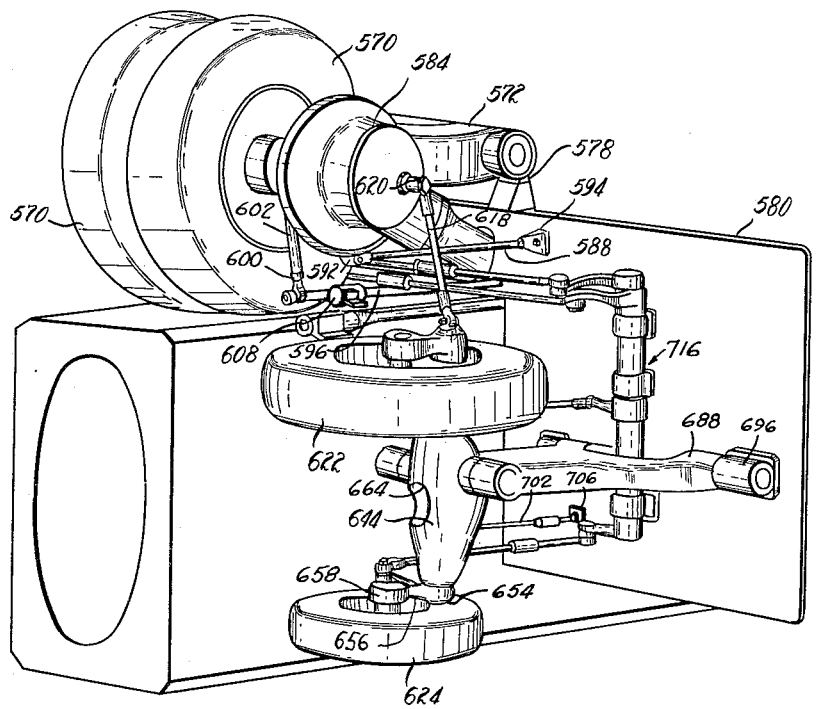

FIGURES 10 and 11, respectively, are enlarged fragmentary sections taken along 10—10 and 11—11 of FIGURE 1 showing the construction of the lower side guide wheel mounting assembly;

FIGURE 12 is an enlarged plan view with parts in section showing a portion of the stabilizer system;

FIGURE 13 is an enlarged plan view with parts in enlarged partial section showing a portion of the mounting assembly and spring suspension for the side guide wheels;

FIGURE 14 is a perspective view of a running gear construction according to a further embodiment of the invention;

FIGURE 15 is a side elevation of the running gear of FIGURE 14 partly in section to show details of construction;

FIGURE 16 is a front elevation of a portion of the running gear of FIGURE 14; and FIGURE 17 is a top plan view of the running gear of FIGURE 14 partly in section.

Referring now more particularly to the drawings, and especially to FIGURES 1 through 13, the running gear of the present invention is particularly adapted for use with a monobeam track of the type indicated generally at 20 having a horizontal top running surface 21 and opposite vertical running surfaces 22 and 23. The beam 20 is preferably of reinforced concrete construction and because of certain unique features of the running gear of the present invention does not necessarily include special rails.

The lower portion of the vehicle shown in FIGURE 4 to which the novel running gear is attached has a downwardly opening central channel 24 adapted to receive the monobeam 20. The channel 24 is formed between depending side portions 25 and 26 which are ordinarily utilized to house cargo, baggage, the vehicle power plant and auxiliary equipment. The main passenger section of the vehicle body, not shown, is secured to the upper double plated and substantially flat covering or surface of the underside of the vehicle body portion shown in FIGURE 4 which surface is generally indicated by 27. The car section is provided at each end with a rigid cast end plate assembly 28 upon which the principal components of the running gear are mounted.

The plate is flat on its forward surface except for the mounting bosses 29, 30, 31, 32, 33 and 34 to which portions of the wheel suspension system are attached. These mounting bosses, which are shown only on the left side of the plate assembly, are duplicated on the right side of the assembly which is broken away to show the position of various units such as the motor and brakes. The mounting bosses are preferably cast integrally with the plate assembly and are milled to provide aligned planar support surfaces.

Integrally cast strengthening ribs 35 extend over the rear surface of the plate 28 to distribute the forces transmitted to the mounting bosses 29—34.

The plate 28 is bolted to beam 36 (three shown) which extend lengthwise of the car body sections 25 and 26.

The beams 36 also support the brake mechanism indicated generally at 37, the drive motor 38, and the drive gear box 39.

Transverse and longitudinal ribs 40 and 41, respectively are provided to strengthen the car body and support the car body skin. Additional rib members (not shown) are provided to support the double plated covering or surface 27 of the lower car body section shown in FIGURE 4 which constitutes the sub-floor of the passenger section of the vehicle.

In its preferred form the novel running gear comprises a pair of driven main supporting wheels 44 and 45 provided with pneumatic tires 46 and 47, respectively, adapted to ride over the upper surface 21 of the monobeam and opposed pairs of upper and lower side wheel and tire assemblies 48, 49, 50 and 51, respectively, each of the wheels being spring suspended from the end plate 28 of the car body as hereinafter described in detail.

The load carrying wheels are preferably formed on a single hub 54 having spaced radial flanges 56 and 58 to which the rims of the wheels are secured. The rims are of split construction comprising respective inner members 60 and 62 (FIGURE 5) and respective outer members 64 and 66. The rim members 60 and 64 are secured to the flange 56 by bolt and nut assemblies 68 and the rim members 62 and 66 are similarly secured to the flange 58 by bolt and nut assemblies 70. Each of the outer rim members 64 and 66 are provided with radially extending strengthening ribs 72 (FIGURE 2). The tires 46 and 47, which are preferably tubeless, are mounted on the respective rims and enclose emergency rims 74 and 76 which are also clamped between the mating rim sections 60, 64 and 62, 66. Packing rings 78 and 80 are clamped between their respective rim sections to seal the air space enclosed by the tires.

Figure 5:
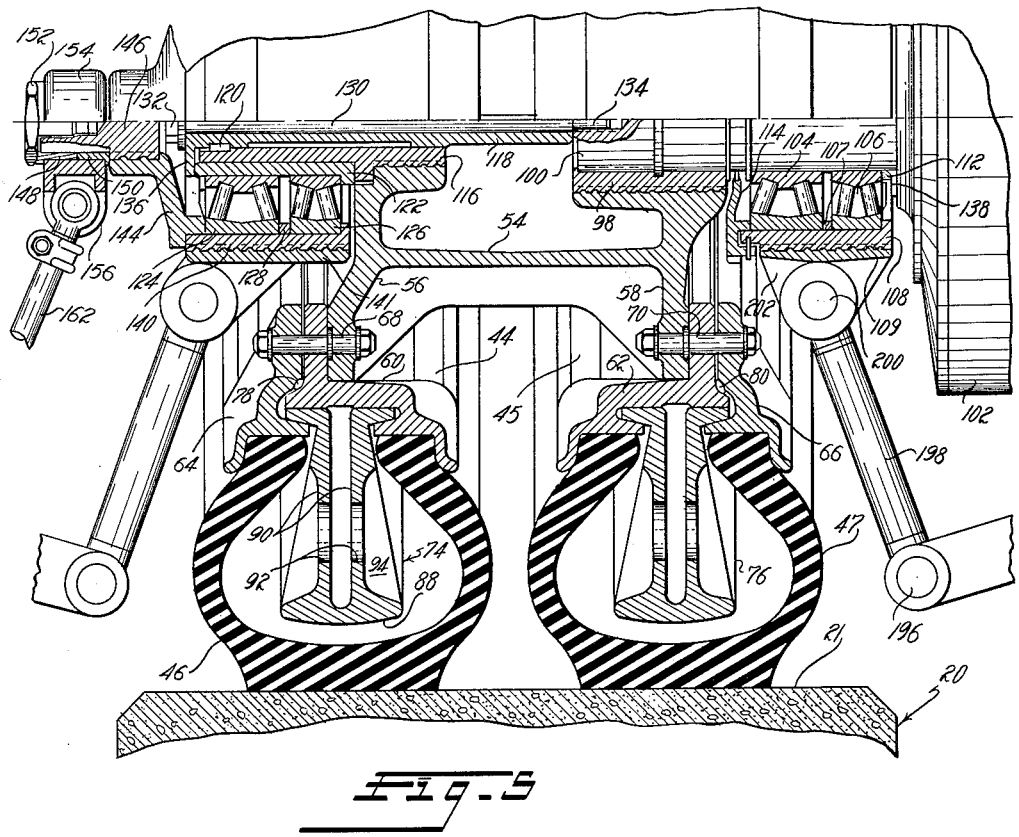
FIGURE 5 is an enlarged fragmentary section taken along line 5—5 of FIGURE 3 showing details of construction of the main load carrying and driving wheels and the mounting therefor.
Figure 6:
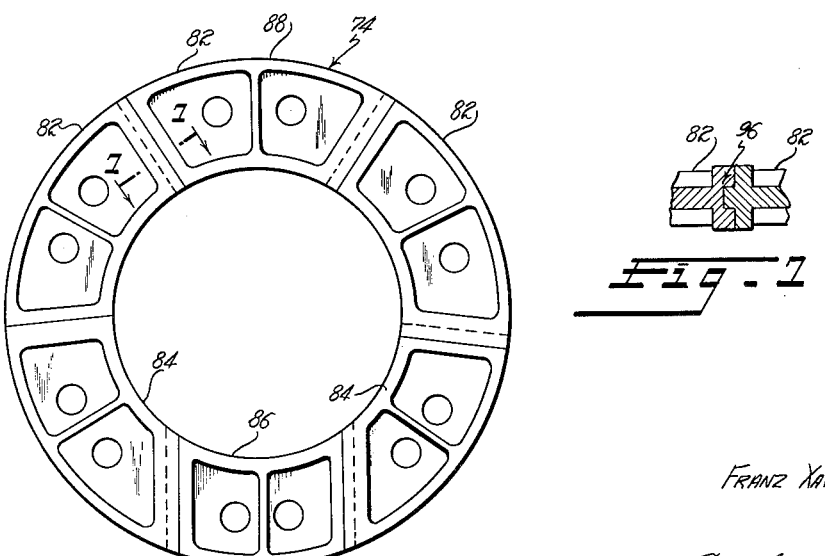
FIGURE 6 is a side view of an emergency rim construction shown removed from the vehicle.
Figure 7:
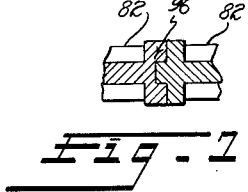
FIGURE 7 is a fragmentary section taken along line 7—7 of FIGURE 6.

The rims 74, as shown in FIGURE 6, comprise three symmetrical light metal segments 82 and two symmetrical sections 84 so formed that a final or closure segment 86 having parallel end walls may be inserted after assembly of the segments 82 and 84. Each of the rim sections comprises the outer rim 88 integrally joined with a pair of spaced rings 90 which are provided with lightening holes 92 and radially extending strengthening ribs 94. The holes 92 reduce the weight of the assembly and increase the volume of air contained in the tires 46 and 47. As shown in FIGURE 7 the adjacent sections of the emergency rim are joined by a tongue and groove construction 96.

A steel bushing 98 is cast in the hub 54 opposite the flange 58 and is provided with internal splines which engage external splines formed in a stub shaft 100 which is the power output member of the drive gearing in housing 102. Two self-aligning roller bearing assemblies 104 and 106 rotatably support the stub shaft 100 externally of the wheel hub 54 and are separated by a spacer ring 107. The outer race of the bearings is supported in a steel bushing 108 press fitted into a bore in a bearing boss 109 integral with a rocker arm 110 (FIGURE 3). Suitable sealing means 112 and 114 are provided at the inner and outer sides of the bearings, respectively.

A steel bushing 116 is cast or press fitted into the wheel hub 54 opposite the flange 56 and is non-rotatably secured to an inner bushing 118 by a key construction 120. Externally of the hub the bushing 116 supports a bushing 122 on which self-aligning bearing assemblies 124 and 126 are mounted and separated by a spacing ring 128. Suitable cover and sealing structure is provided at the inner and outer ends of the bearings.

A shaft 130 journalled in the inner bushing 118 having a hex head 132 is threaded into the stub shaft 100 as at 134. Accordingly when the shaft 130 is positioned within the stub shaft 100 the respective flanges 136 and 138 on the shaft 130 and stub shaft 134 hold the bearings in place on the opposite sides of the two wheel assemblies. The outer race of the bearing assemblies 124 and 126 is received in a bushing 140 cast in the bore of a bearing boss 141 formed in one end of a rocker arm 142 (FIGURE 3). The entire bearing assembly is sealed by a cover plate 144 secured to the rocker arm 142 as by screws 145 (FIGURE 3). Cast into the cover plate 144 is a stub shaft 146 onto the outer end of which bushings 148 and 150 are pressed. The bushings are held in place by a lock nut 152 threaded into the outer end of the stub shaft 146. Mounted on the bushings 148 and 150 is a bearing member 154 provided with a pair of spaced bearing bosses 156 and 158 (FIGURE 3) which pivotally supports sockets 159 and 160 attached to the upper ends of tension rods 162 and 164, respectively, which support the side wheels 49 and 51 in a manner described in detail below.

As best shown in FIGURE 3 the rocker arms 142 and 110 extend rearwardly to a point beyond the periphery of the tires 46 and 47 and are provided at their free ends with bearing bosses 170 and 172 respectively. These bosses and the associated internal structure are of identical construction. Accordingly, only the boss 170 will be described. A steel bushing 174, having a conical internal surface, is cast in the bearing boss 170 and a clamping sleeve 176 of tapered section is positioned between the bushing and a hollow shaft 178. A nut 180 threaded under the projecting end of the clamping sleeve 176 is effective when tightened to lock the members 170, 174, 176 to the shaft 178. The shaft 178 is mounted in similar manner in the bearing lug 172. Between the two bearing lugs of the rocker arms the shaft 178 in journalled by a suitable bearing construction 182 in an elongated bracket 184 which is rigidly secured as by bolts 186 to the top surface of the vehicle end plate assembly 28 (FIGURE 2).

By virtue of this construction the load carrying wheels 44 and 45 are mounted for free pivotal movement with respect to the car body about the axis of shaft 178 and are restrained against lateral movement beyond that permitted by normal manufacturing tolerances.

Further this construction permits easy assembly and disassembly of the wheels 44 and 45 when necessary to change the tires or wheels or for other reasons. For example, in order to remove the wheels, the screws 145 are removed to permit removal of the cover 144, the parts suspended from the cover being sutiably supported against undue downward displacement. After loosening nut 180 (FIGURE 3) and shaft 130 (FIGURE 5) the rocker arm 142 together with the bushing 120 and shaft 130 are pulled away from the assembly. This step and the subsequent reassambly of the parts may be facilitated if an assembly pin is positioned in the end of the bore of shaft 178 to support the members 170 when laterally displaced. When the rocker arm 142 has been displaced laterally a sufficient distance, the hub 54 and the wheels 44 and 45 may be pulled off the stub shaft 100 and removed. The wheels may be reinstalled by reversing these steps.

The load carrying wheels 44 and 45 are resiliently suspended directly from the vehicle body by a balanced torsion bar suspension system including the opposed torsion bars 190 and 192 which extend along opposite sides of the main wheels in a direction parallel to the axis of the monobeam 29. The forward end of the torsion bar 192 is splined to a bell crank 194 (FIGURE 1), one arm of which is pivotally connected as at 196 to the lower end of a link 198, the upper end of which is pivotally secured as at 200 to a boss 202 formed integrally with the rocker arm 110 (FIGURE 3). The portion of the torsion bar 192 projecting forwardly from the bell crank 194 is journalled for free rotation in a bracket 204 adapted to be rigidly secured to the vehicle body by means not shown. The torsion bar 192 extends through an aperture 205 in plate assembly 28 (FIGURE 4) and at its rearward end is splined to a fitting 206 rigidly secured to the upper surface 27 of the lower car body section as by screws 208 preferably extending into one of the main beams 36.

A shock absorber 210 is pivotally secured at one end as at 212 to the short arm of bell crank 194 and is pivotally secured at its opposite end as at 214 to a bracket 216 which is rigidly secured to the car body by means not shown.

The mechanism for mounting the opposite torsion bar 190 and connecting it to the rocker arm 142, to the shock absorber system and to the vehicle body is the same as that just described for mounting torsion bar 192.

As stated above the supporting wheels 44 and 45 are driven by the stub shaft 100 (FIGURE 5) which is the power output member of the gear box 102. The power input member 220 (FIGURE 2) of the gear box 102 is connected by a universal joint 222 to a drive shaft 224 which extends through an aperture 226 (FIGURE 4) in plate 28 and is connected to bevel gearing housed in the gear box 39. A spline connection 230 is provided between the gear box 39 and the drive shaft 224 to accommodate changes in the effective length of the drive shaft caused by the vertical swinging movement of the drive wheels 44 and 45. The input shaft 232 of the gear box 39 is driven by the electric motor 38 and this drive connection includes an overload clutch 236 of conventional construction. The drive shaft 232 is connected at the other side of the gear box 39 through a flexible coupling 238 to a brake shaft 240 journalled in brackets 242 and 244 rigidly secured to the beams 36.

Brake discs 246 and 248 are mounted for rotation with the shaft 240 and are provided with annular side face surfaces adapted to be gripped by respective brake shoes 250, 252, and 254, 256 which are supported on a unique free floating lever system now to be described with particular reference to FIGURE 2.

The lever 258 carrying the brake shoe 250 is pivotally connected as at 260 to a link 262 pivotally connected to one arm of the bell crank 264 which is in turn fulcrumed on the car frame as at 266 by means not shown. The other arm of the bell crank 264 is connected to the piston of a brake cylinder 268 secured by bolts 269 to the rear surface of the plate 28. The upper end of the brake lever 258 is connected by a tension spring 270 to the upper end of a brake lever 272 pivotally secured to a transverse beam 274 mounted in the car body structure by means not shown. The upper ends of the free floating intermediate levers 276 and 278, respectively carrying the brake shoes 252 and 254, are connected by a link 280. The sets of levers 258, 276 and 278, 272 are adjustably spaced apart by identical adjusting mechanisms 282 and 284. Each of the brake levels is provided with a roller 286 adapted to ride over the upper surface of a track 288 rigidly supported at its opposite ends by the beam 274 and a section 289 which extends transversely of the car body and is supported at its opposite ends by the rib 41 and by an additional rib (not shown) attached to the vehicle body skin. Each of the brake levers is bifurcated and the track 288 extends between the arms of the levers (FIGURE 4).

The braking moments are transmitted directly from the respective brake shoe assemblies to the car body frame by links 290 (FIGURE 3) pivotally connected at one end to the brake shoe assemblies and at their other ends to the car body frame whereby the braking forces are transmitted directly to the car body frame in the plane of the brake shoes. Thus all bending stresses on the brake levers which might otherwise occur during braking are avoided.

Up to about twenty miles per hour the braking is effected by generator brakes through the electric motor 38. The mechanical brakes come into operation at all speeds above twenty miles per hour and operate as follows. Operating fluid is admitted to the brake cylinder 268 by conventional valving mechanism (not shown) to rotate the bell crank 264 in a clockwise direction as viewed in FIGURE 2. The upper end of the lever assembly 258 is moved to the left, this movement being transmitted through the adjusting mechanism 282 to the lever assembly 276 and thence through the link 280 to the lever assembly 278. Through the adjusting mechanism 284 the leftward movement of the lever assembly 278 is transmitted to the brake lever assembly 272. Since this lever assembly is fulcrumed on the car body frame, only the lower portion thereof moves to the left until the brake shoe 256 comes to rest against the brake disc 248. At this moment the point of attachment of the adjusting mechanism 284 to the lever assembly 278 becomes the pivot about which the latter moves until the brake shoe 254 comes to rest against the adjacent surface of the brake disc 248. The ends of the link 280 thus become fulcrums and the lever assembly is rotated in a clockwise direction about this pivot until the brake shoe 252 comes to rest against the brake disc 246 at which time the opposite ends of the adjustment mechanism 282 become pivots and the lever assembly 258 moves in a counterclockwise direction until the brake shoe 250 comes to rest against the opposite surface of the brake disc 246. Further movement of the bell crank 264 in a clockwise direction will thus cause each of the brake shoes to move against the adjacent surfaces of the brake discs to increase the braking action. The whole braking process takes place in a very short time and provides a smooth, effective progressive braking action.

The side guide wheel and tire assemblies 48, 49, 50 and 51 are suspended from the main supporting and driving wheels 44 and 45 by a unique suspension system now to be described which effectively maintains the axis of the wheels in a vertical plane and yet permits bodily movement of the wheels vertically along the side surfaces of the beam as well as laterally of the beam, each of these movements being controlled in a predetermined manner by one or more torsion bars.

The suspension of the upper tire and wheel assembly 48 will be considered first with particular reference to FIGURES 8 and 9. The main rim assembly 300, the emergency rim assembly 302 and the tubeless tire 304 are of the same general construction as the corresponding components of the main wheel construction and need not be described in detail. The hub 306 of the wheel is rotatably mounted by means of self-aligning bearing assemblies 308 and 310 on a hollow axle 312. The lower bearing assembly 310 is held on the axle 312 by a lock nut construction 314. Received within the central bore of the axle 312 is a shaft 316. The shaft 316 and the axle 312 are nonrotatably secured together by any suitable means, not shown. The upper end of the rod 316 projects through a central vertical bore 318 in a supporting bracket 320, the lower end of which is provided with a bushing 322 which engages the upper end of the axle 312.

The lower end of the shaft 316 projects through a bore 324 formed in a lower support bracket 326, the upper end of the bore 324 being provided with a steel bushing 328 which bears against the lower end of the axle 312. At its upper and lower ends the shaft 316 is provided with lockable nuts 330 which, when drawn tight, hold the wheel assembly and the upper and lower supporting brackets 320 and 326 in rigid assembled relation.

The upper portion of bracket 320 is provided with an elongated horizontal through bore 332 having cast bushings 334 which support an elongated hollow shaft 336. Beyond the ends of the bracket 320 the shaft 336 extends through bronze bushings 338 and 340 mounted in bearing bosses 342 and 344 formed respectively on the two arms of a rigid hollow carrier member 346. The shaft 336 also extends through a bushing 348 mounted in a bearing member 350 provided with opposed lugs 352 and 354 to which the sockets 356 and 358 forming the lower ends of rods 360 and 362 (FIGURES 2 and 9) respectively are secured. The upper ends of the rods 360 and 362 are pivotally secured to lugs 364 and 366 (FIGURES 2 and 3) respectively formed integrally with the gear housing 102. The rods 360 and 362 (FIGURE 1) thus form a triangular connection between the gear box 102 and the mounting assembly for the upper wheels. Accordingly moments arising from the drive are diverted from the gear box through the triangular connection directly to the upper guiding assembly and thence to the car body by means to be described. The moments resulting from the spring suspension of the upper wheels do not operate against or with the drive moment as would be the case if the gear box were flange mounted directly on the bearing.

With continued reference to FIGURES 8 and 9 the end of the carrier 346 remote from the shaft 336 is provided with bearing bosses 368 and 370 having aligned bores 372 and 374 respectively carrying bushings 376 and 378 in which a hollow shaft 380 is journalled. A bifurcated connector 381 is welded to one end of shaft 380 for connection to the stabilizer as described below. Between the bosses 368 and 370 the shaft 380 is journalled in bearing caps 382 and 384 clamped together by bolts 386. The lower bearing cap 384 has a downwardly projecting cylindrical section 388 journalled in a bushing 390 mounted in a bearing boss 392 of a bracket 394 rigidly secured to the mounting pad 29 of the car wall end plate construction 28 as by bolts 398.

A bushing 400 mounted in the lower end of bracket 394 journals an extension 402 of an upper clamping member 404 which together with the lower clamping member 406 which is secured to it by bolts 408 journals a central portion of a shaft 410 in the same manner as shaft 380 is journalled in the clamping members 382 and 384. The extensions 388 and 402 are non-rotatably connected by a tongue and groove construction 419 and are held in assembled relation by a draw rod 420. At its opposite ends the shaft 410 supports a lower carrier member 412 in the same manner as shaft 380 supports the carrier 346. The carrier 412 is provided with bearing bosses 414 and 416 which are supported on the opposite ends of a transverse shaft supported in the lower support bracket 326 in the same manner as the shaft 336 of the upper bracket member 320.

The lower clamp member 406 has a downwardly projecting extension 421 having internal splines which receive the splined upper end of a torsion bar 422. As best shown in FIGURE 13 the lower splined end of the torsion bar 422 is mounted in a splined bushing 424 having an external tapered surface mounted in a similarly tapered bore of a bracket 426 rigidly secured to the intermediate mounting pad 30 of the vehicle end plate assembly 28 as by bolts 430. The preload of the torsion bar 422 is adjusted by rotation of the bushing 424 which has a hex shoulder 432 for this purpose. The bushing 424 is locked in adjusted position by a lower plate 434 threaded onto the lower end of the bushing to wedge the bushing within the bracket 426. A clamping nut 436 is provided to adjust the vertical position of the torsion bar 422.

The suspension system thus far described effectively supports the wheel and tire assembly 48 from the main supporting and driving wheels and from the car body and permits vertical shifting of the wheel about the pivot shafts 380, 410, 336 and 418 (FIGURES 9 and 9A) to correspond with similar movements of the driving and supporting wheels under the control of the torsion bars 190 and 192 (FIGURES 1 and 2) and permits lateral swinging movement of the wheel and tire assembly in a horizontal plane about the axis of shafts 388 and 402 against a predetermined resistance offered by the torsion bar 422. All major forces acting on the guide wheel are transmitted directly to the car body either through the torsion bars 190 and 192 or through the bracket assemblies 394 and 430 to the car end plate assembly 28.

A substantially identical assembly including the tension rods 162 and 164 described above is provided for supporting the opposite upper guide wheel and tire assembly 49.

The lower guide wheels 50 and 51 are supported from the upper guide wheels 48 and 49, respectively, by substantially identical constructions. Accordingly only the mechanism for supporting the guide wheel 50 will be described with particular reference to FIGURES 1, 2, 10 and 11. The wheel and tire assembly 50 is of essentially the same construction as the upper guide wheels and the main supporting wheels and includes a main rim, an emergency rim and a tubeless tire. The wheel assembly is supported by bearing means on an axle shaft 440 which extends upwardly into a cylindrical extension 442 of a support bracket 444, the reduced upper portion of the axle being secured to the bracket by means of a lock nut construction 446.

The bracket 444 is provided with laterally projecting arms 443 to which the lower ends of tension rods 448 and 450 are secured, the upper ends of the rods being similarly secured to the arms of the brackets 326.

As shown particularly in FIGURE 10 the bracket 444 is provided with a horizontal bore 445 in the opposite ends of which bushings 449 are cast. A hollow shaft 451 is journalled in the bushings 449 and extends beyond the bracket 444 into bushings 452 pressed into bearing bosses 454 and 456 of a rigid hollow carrier unit 458 which is generally of the same construction as the carrier members 346 and 412 described above.

A draw rod 460 extends through the hollow shaft 451 and carries on one end a plate 462, a shoulder 464 of which abuts the outer surface of bearing boss 456. The draw rod 460 is provided with an enlarged bore to permit relative movement between it and the adjacent portion 441 of the axle 440. A plate 466 is telescoped around the opposite end of the draw rod 460 and is clamped tightly against the outer surface of the bearing boss 454 by a lock nut 468 threaded onto the outer end of the draw rod 460. This construction assures uniform transmission of the moments resulting from the wheel pressure to both bosses 454 and 456 of the carrier 458 which permits the use of bearing bosses of minimum size and weight. The axle 440 is provided with a key 469 which fits within an elongated groove in the shaft 451 to prevent rotation of the axle 440.

The construction of the carrier 458 at the end remote from the bracket 444 is identical with the corresponding portion of the carriers 346 and 412 and is supported for pivotal movement about a horizontal shaft 470 (FIGURE 13). The shaft 470 in turn is supported by upper and lower bearing caps 472 and 474 secured together by bolts 476. An integral downwardly projecting section 478 is journalled in a bracket 480 secured by bolts 484 to the lower mounting pad 31 formed on the forward face of the car end plate 28. Suitable retaining nut structure 486 is provided on the lower end of the journal 478 to retain the parts in assembled relation.

Thus it will be seen that the lower guide wheel and tire assembly 50 is supported for vertical shifting movement with the upper guide wheel and the main driving and supporting wheels as the carrier 458 pivots about the shaft 470. The wheel and tire assembly 50 is also mounted for pivotal movement laterally of the beam about the axis established by the bracket 480 and the stub shaft 478. The opposite lower guiding wheel and tire assembly 51 is supported in exactly the same manner from the upper wheel and tire assembly 48 and from the car body.

By means now to be described, and best shown in FIGURES 1, 3 and 12, lateral movements of the guide wheel and tire assemblies are cross stabilized by torsion members which form a part of the spring suspension for both the upper and lower sets of guide wheels. The stabilizing system includes two torsion bar assemblies indicated generally at 494 and 496 which are secured directly to the car end plate assembly 28. Since the torsion bar assemblies 494 and 496 are identical only the assembly 494 will be described. This assembly includes a hollow torsion cushioning tube 498 mounted in a bronze bushing 500 (only the rim of which is visible) which is supported in a bearing 502 secured as by bolts 504 to the mounting pad 34 formed in the forward face of the end plate assembly 28. A plate 508 is welded onto the lower end of the tube 498 and engages the upper surface of the bushing 500 to prevent downward displacement of the tube 498. The upper end of tube 498 is rotatably journalled in a tube 512 and is provided with internal splines which engage corresponding splines in the lower end of a torsion bar 510. The tube 512 is journalled in bronze bushings 514 and 516 in bearing brackets 518 and 520 which are secured by bolts 522 and 524 to the intermediate and upper mounting pads 33 and 32 of the end plate assembly 28. A cap member 530 is secured to the upper end of the torsion bar 510 by a bolt 532 and is provided with internal splines which engage the mating splines on the upper end of the torsion bar. The cap is rotatably journalled in the upper end of the tube 512 and is held in position by a screw 534 mounted in the tube 512, the conical or pointed inner end of which engages a groove 536 formed in the cap member 530. Non-rotatably secured to the lower end of the torsion cushioning tube 498 is a lever 538 pivotally connected by a pin 540 to a link 542 partially shown in FIGURE 3 which in turn is pivotally connected by a pin 544 to a bifurcated connector 546 welded to the projecting end of the shaft 470. A similar lever 548 is rigidly secured to the tube 512 and is connected by a link 550 to the fitting 381 secured to the projecting end of shaft 380.

A collar 554 welded to the upper end of the tube 512 carries a lever 556 to the free end of which a draw rod 558 is pivotally secured as at 560. A similar lever 562 formed integrally with the cap 530 is pivotally secured at its free end to a draw rod 564. The draw rods extend through apertures 565 in the plate 28 and are connected, respectively, to crossed levers 566 and 568 rigidly secured, respectively, with the cap 530 and the tube 512 of the torsion bar assembly 496 (FIGURE 1A).

Thus the upper guide wheel 48 is cross connected to the opposite lower guide wheel assembly 51 and the opposite upper guide wheel 49 is cross connected to the lower opposite guide wheel 50. Accordingly, the stabilizer effectively equalizes contact pressures between the various guide wheels and the adjacent surfaces of the beam. During tilting movements of the vehicle, strong counter forces are immediately established which tend to restore the vehicle to its proper position. It will also be noted that the stabilizer connects each of the lower wheel assemblies 50 and 51 to the torsion bar 422 associated with the upper guide wheel on the opposite side of the beam so that lateral movements of all of the wheels are ultimately under the control of the torsion bars 422.

As indicated above it has been discovered that the riding qualities of vehicles of the type disclosed herein are influenced to a large extent by the lateral and tilting oscillations of the vehicle as well as by the vertical oscillations which are of primary importance in other types of vehicles such as automobiles. Specifically it has been discovered that maximum passenger comfort is achieved when all frequencies of vehicle oscillations are within the range 0.7 to 1.8 oscillations per second. Pure lateral oscillations, that is, oscillations of the vehicle about a vertical axis are caused by inaccuracies in the construction of the track beam and by changes in the direction of the track beam. The same conditions often also produce tilting oscillations, that is, movement of the vehicle about a horizontal axis. Accordingly, in most cases both types of oscillations occur simultaneously producing deflection of both the upper and lower lateral wheels.

In prior constructions without the stabilizer disclosed herein the frequency of the tilting oscillations (which is substantially less than the frequency of the lateral oscillations) was superimposed on the frequency of the lateral oscillations. In these prior constructions a change in the spring constant of all of the springs simply resulted in a change of both frequencies in about the same proportion. Accordingly, it has been impossible heretofore in a system having tilting frequencies within the desired values for passenger comfort to change only the lateral frequencies to conform to passenger comfort or vice versa.

However, by virtue of the stabilizing system herein disclosed for connecting the upper lateral wheel on one side with a lower lateral wheel on the opposite side, the frequencies of the lateral and tilting oscillations are substantially entirely separated. Accordingly, the spring constants of each set of springs can be selected independently to produce optimum passenger comfort consistent with the spring stiffness required to prevent undue tilting or lateral movement of the vehicle with respect to the track.

For example, the frequency of tilting oscillations is primarily a function of spring constants of the torsion bars 510 in the stabilizer system and is not affected by the spring constant of the torsion bars 422. Conversely the frequency of lateral oscillations is dependent on the spring constant of the torsion bars 422 and is independent of the spring constant of the torsion bars 510. This is true even if both sets of springs are loaded, that is, deflected during a given tilting or oscillating movement of the vehicle.

FIGURES 14 through 17, to which reference will now be made, illustrate a modified form of the invention of relatively simplified construction which has essentially the same performance as the embodiment of FIGURES 1 through 13 but is somewhat easier to service and maintain. Because of the basic similarity of the two embodiments of the invention only those portions of the embodiment of FIGURES 14 through 17 which differ substantially from those of the embodiment of FIGURES 1 through 13 will be described in detail.

The construction of the upper wheel assembly together with its spring suspension system and drive system is substantially the same as that described above. The rubber tired wheel assemblies 570 are rotatably journalled in the free ends of rocker arms 572 and 574 (FIGURE 17) pivotally mounted by bosses 576 formed integrally with their opposite ends and bearing assemblies 578 secured to the vehical frame 580.

As best shown in FIGURES 15, 16 and 17 the axle 582 of the upper wheels projects into a housing 584 which encloses a suitable bevel gear assembly, the power input member 586 of which is driven by a motor and gear arrangement substantially as described above in connection with the previous embodiment. The housing 584 is fixed against rotational movement caused by the torsional moments produced by driving the upper wheels by a rod 588 (FIGURES 14 and 15), one end of which is pivotally mounted by means of a screw 590 on a lug 592 formed integrally with the housing 584. At its opposite end the rod 588 is pivotally mounted on brackets 594 rigid with the vehicle frame 580.

The load carrying wheels 570 are resiliently suspended directly from the vehicle body by a torsion bar suspension system including two torsion bars 596 (omitted for clarity from FIGURE 17) one on each side of the wheel assembly (only one of which is shown in FIGURES 14, 15 and 16). The forward end of the torsion bar 596 is splined to a bell crank 598, one arm of which is pivotally connected as at 600 to the lower end of a link 602 (FIGURE 16,) the upper end of which is pivotally secured as at 604 to a boss 606 formed integrally with the rocker arm 572. The portion of the torsion bar 596 projecting forwardly from the bell crank 598 is journalled for free rotation in a bracket 608 rigidly secured to the vehicle body by means not shown. At its rearward end the torsion bar is splined to a fitting (not shown) rigidly attached to the car body. A shock absorber 610, omitted for clarity from FIGURE 14, is pivotally secured at one end by a bolt 612 to the short arm of the bell crank 598 and is pivotally secured at its opposite end as by a bolt 614 to a bracket 616 rigidly secured to the car body by any suitable means.

Secured to each end of the axle 582 is a rod 618, the rod being pivotally connected to the axle by means of a bearing assembly 620 adjustably secured to the upper end of the rod. The rod provides the support for the upper and lower lateral wheels indicated generally at 622 and 624. It will be understood that while only one of the rods 618 and the associated wheel assemblies 622 and 624 are shown identical constructions are provided on the opposite side of the main wheel assemblies 570.

Attached to the lower end of the rod 618 is a support socket 626 pivotally connected by a pin 628 to a bracket 630 formed integrally with the end of a lever 632. At its opposite end the lever is splined to the axle 634 of the upper lateral wheel assembly 622. Splined to the lower end of the axle 634 is a bell crank 636, one lever 638 of which is splined to the upper end of a torsion bar 640 (FIGURE 15). The torsion bar is rotatably journalled at its upper end in a bushing 642 mounted in a suitable bore in the upper end of an egg-shaped housing 644. The lower end of the torsion bar 640 is splined to a bushing 646 mounted in the lower portion of the housing 644. The bushing 646 is provided with an external conical surface which is press fitted into a corresponding conical opening in the lower portion of the housing 644 and is held in place by a nut 648 threaded onto the projecting outer end of the bushing 646. This construction permits regulation of the preloading of the torsion bar 640. The assembly is retained in adjusted position by a screw 650 passing through the nut 648 and threaded into the lower projecting end of the torsion bar 640. The screw 650 facilitates the assembly of the bushing 646 and the torsion bar 640.

A second torsion bar 652 is mounted in the housing 644 in the same manner as the torsion bar 640 with the exception that its splined end is secured to the upper portion of the housing 644 and its lower end is journalled for free rotation in the lower portion of the housing 644. Secured to the lower end of the torsion bar 652 is a bell crank 654, one lever 656 of which is formed with a boss 658 in which the upper end of the axle 660 for the lower lateral wheel 624 is mounted. Suitable openings 662 and 664 are provided in the housing 644 to facilitate assembly of the bushing 646 and the corresponding assembly for the torsion bar 652.

As best shown in FIGURE 17 a rocker arm 666 is pivotally connected to the housing 644 by a pin 668 which extends horizontally through the housing. The pin 668 is supported within the housing 644 in bushings 670 and 672 mounted in bosses 674 and 676 in the housing 644. The pin 668 is also supported in bushings 678 and 680 mounted in bosses 682 and 684 formed integrally with the outer ends of the arms of the rocker arm 666. A nut 686 holds the pin in place. At its opposite end the rocker arm 666 is provided with bosses 688 and 690 through which pins 692 and 694 extend into bearing assemblies 696 and 698 secured by bolts 700 to the vehicle frame. The rocker arm 666 is thus supported for pivotal movement about a substantially horizontal axis.

A rod 702 is pivotally connected to a boss 704 formed in the housing 644 (FIGURE 16) and at its opposite end is pivotally connected to a bracket 706 suitably secured to the vehicle frame. The bar 702, which is of adjustable length, serves as a guide bar to prevent tilting of the housing 644 and the wheel assemblies 622 and 624. The levers 708 and 710 (FIGURES 16 and 17) of the bell cranks 636 and 654 are pivotally connected respectively to rods 712 and 714 which are connected to a stabilizer system indicated generally at 716 which is of the same construction as the corresponding assembly in the embodiment of FIGURES 1 through 13.

While the foregoing constructions are the preferred forms of the invention nevertheless certain variations may be made without departing from the spirit of the invention. For example, the pivotal joints may include elastic members or rubber bearings with or without additional shock absorbing assemblies if desired. Also, since the rods 618 are loaded only in tension they may be replaced by cables in some cases. In lieu of torsion bar arrangements disclosed other spring systems such as air suspension systems or conventional coil springs may be utilized. Also the lateral wheel assemblies alternatively may be supported directly by the vehicle body rather than the load carrying wheels without changing their essential function.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Running gear for supporting a vehicle body for passage along a monobeam having top and side running surfaces comprising, at least one load carrying wheel adapted to ride along said top running surface; means supporting said load carrying wheel on said vehicle body; upper and lower side wheels mounted directly on said vehicle body at opposite sides of said beam and adapted to ride along said side running surfaces; and resilient means independent of the side wheel mounting means interconnecting the upper side wheel on one side of the beam to the lower side wheel on the other side of the beam.

2. Running gear for supporting a vehicle body for passage along a monobeam having top and side running surfaces, said vehicle body having a rigid end plate construction, comprising, at least one load carrying wheel; rocker arms pivotally secured to said end plate and supporting said load carrying wheel for movement in a vertical plane; torsion bars operatively connected to said load carrying wheel and to said vehicle body for resiliently urging said load carrying wheel against said top running surface; upper and lower pairs of side wheels adapted to run along said side running surfaces; carriers supporting said side wheels; means supporting said carriers on said end plate for movement about vertical and horizontal axes; vertically extending torsion bars having one end operatively connected to said end plate and their opposite ends operatively connected to said side wheels and urging said side wheels laterally against the adjacent beam surfaces; and rigid means connecting said load carrying wheels and said side wheels, said rigid means preventing relative movement of all of said wheels in a vertical direction.

3. Running gear for supporting a vehicle body for passage along a monobeam having top and side running surfaces, said vehicle body having a rigid end plate construction, comprising, at least one load carrying wheel; rocker arms pivotally secured to said end plate and supporting said load carrying wheel for movement in a vertical plane; torsion bars operatively connected to said load carrying wheel and said vehicle body for resiliently urging said load carrying wheel against said top running surface; upper and lower pairs of side wheels adapted to run along said side running surfaces; carriers supporting said side wheels; means rigid with said end plate and supporting said carriers for movement about vertical and horizontal axes; vertically extending torsion bars having one end operatively connected to said end plate and their opposite ends operatively connected to said side wheels and urging said side wheels laterally against the adjacent beam surfaces; means connecting said load carrying wheel and said side wheels, said means preventing relative movement of all of said wheels in a vertical direction; additional torsion bars mounted on said end plate; means connecting one end of said additional torsion bars to an upper side wheel; and means connecting the other end of said additional torsion bars to a lower opposite side wheel to correlate the lateral movements of said upper side wheels with the lateral movements of the lower side wheels.

4. Running gear for supporting a vehicle body for passage along a monobeam having top and side running surfaces comprising at least one driving wheel adapted to ride along the top running surface; spring means mounting said driving wheel directly on said vehicle body; a drive gear assembly encased in a housing suspended with said load carrying wheel directly from said vehicle body, said gear assembly having an output shaft drivingly connected to said drive wheel and an input shaft angularly related to said output shaft and adapted to be connected to a source of power; upper and lower side wheels mounted directly on said vehicle body and adapted to run along said side running surfaces; pivot means mounted directly on said vehicle body supporting said side wheels for movement in vertical and horizontal planes; and means connecting said drive gear housing to said pivot means to transmit driving moments from said drive gear housing directly to said pivot means.

5. Running gear for supporting a vehicle body for passage along a monobeam having top and side running surfaces comprising at least one load-carrying wheel adapted to ride along said top running surface; means mounted directly on said vehicle body and journalling said load-carrying wheel for rotation about a substantially horizontal axis, a pair of housings, means pivotally mounted on said vehicle body and supporting one of said housings at one side of said beam for vertical shifting movement, means pivotally mounted on said body and supporting the other of said housings at the opposite side of said beam for vertical shifting movement, means spring-suspending a pair of side wheels in vertical spaced relation in one of said housings, and means spring-suspending a pair of side wheels in vertically spaced relation in the other of said housings, said side wheels being urged against said side running surfaces by said spring suspending means.

6. Running gear for supporting a vehicle body for passage along a monobeam having top and side running surfaces comprising, at least one load carrying wheel adapted to ride along said top running surface; a rocker assembly rotatably supporting said wheel; means mounting said rocker assembly directly on said vehicle body for swinging movement about a substantially horizontal axis; spring means mounted on said vehicle body for limiting said swinging movement of said rocker assembly; pairs of side wheels adapted to ride along said side running surfaces, and pivot means mounted directly on said vehicle body supporting said side wheels for movement toward and away from said side running surfaces of said beam.

7. Running gear for supporting a vehicle body for passage along a monobeam having top and side running surfaces comprising, at least one load carrying wheel adapted to ride along said top running surface; a carrier supporting said load carrying wheel and pivotally mounted on said vehicle body for swinging movement about a substantial horizontal axis; side wheels adapted to ride along said side running surfaces; additional carriers pivotally mounted directly on said vehicle body for swinging movement about a substantially vertical axis and supporting said side wheels for movement laterally of said body; and resilient means mounted on said vehicle body and operatively connected to said carriers to yieldingly urge each of said carriers and said wheels toward the adjacent beam surfaces.

8. Running gear for supporting a vehicle body for passage along a monobeam having top and side running surfaces, said vehicle body having a rigid transverse support assembly, comprising, at least one load carrying wheel, a rocker assembly pivotally secured to said support assembly and supporting said load carrying wheel for movement in a vertical plane; torsion bars operatively connected to said rocker assembly and to said vehicle body resiliently urging said load carrying wheel against said top running surface; pairs of side wheels adapted to run along said side running surfaces; a pair of carriers, each supporting a pair of said side wheels, pivot means supporting said carriers on said support assembly for movement about vertical axes and means yieldingly urging said side wheels laterally against the adjacent beam surfaces.

9. Running gear for supporting a vehicle body for passage along a monobeam having top and side running surfaces, said vehicle body having a rigid transverse support assembly comprising, at least one load carrying wheel, a rocker assembly pivotally secured to said support assembly and supporting said load carrying wheel for movement in a vertical plane, torsion bars operatively connected to said rocker assembly and to said vehicle body for resiliently urging said load carrying wheel against said top running surface, upper and lower pairs of side wheels adapted to run along said side running surfaces, carriers supporting said side wheels, pivot structure supporting said carriers on said support assembly for movement about vertical axes, torsion bars having one end fixed to said support assembly and their opposite ends operatively connected to said pivot structure and arranged to urge said side wheels laterally against the adjacent beam surfaces; additional torsion bars mounted on said support assembly, means connecting one end of said additional torsion bars to an upper side wheel, and means connecting the other end of said additional torsion bars to a lower opposite side wheel whereby the lateral movements of said upper side wheels are correlated with the lateral movements of the lower opposite side wheels.

10. Running gear for supporting a vehicle body for passage along a monobeam having top and side running surfaces, comprising at least one load carrying wheel adapted to ride along the top running surface; spring means resiliently connecting said load carrying wheel directly to said vehicle body; upper and lower side wheels mounted directly on said vehicle body and adapted to ride along said side running surfaces; resilient means independent of the side wheel mounting means interconnecting the upper side wheel on one side of the beam to the lower side wheel on the other side of the beam; and rigid links connecting the side wheels to the load carrying wheel for vertical co-movement with respect to said vehicle body.

11. Running gear for supporting a vehicle body for passage along a monobeam having top and side running surfaces, comprising at least one load carrying wheel adapted to ride along said top running surface; means resiliently connecting said load carrying wheel directly to said vehicle body; upper and lower side wheels connected to said vehicle body at opposite sides of said beam adapted to ride along said side running surfaces; spring means operatively connected to said vehicle and certain of said side wheels for urging certain of said side wheels resiliently against said side running surfaces; and additional spring means carried by said vehicle body interconnecting an upper side wheel on one side of said beam and a lower side wheel at the opposite side of said beam.

12. Running gear for supporting a vehicle body for passage along a monobeam having top and side running surfaces, comprising at least one load carrying wheel adapted to ride along said top running surface; means resiliently connecting said load carrying wheel directly to said vehicle body; upper and lower side wheels resiliently connected to said vehicle body at opposite sides of said beam and adapted to ride along said side running surfaces, a spring system supported on said vehicle body interconnecting an upper side wheel at one side of said beam to the lower side wheel at the opposite side of said beam and an additional spring system resiliently connecting said upper side wheels to said vehicle body.

13. Running gear for supporting a body for passage along a monobeam having top and side running surfaces comprising, at least one load carrying wheel adapted to ride along said top running surface; means connected directly to said body spring mounting said load carrying wheel on said vehicle body; side wheels adapted to ride along said side running surfaces; means connected directly to said body spring suspending said side wheels for movement laterally of said monobeam; and rigid links connecting said side wheels to said load carrying wheel to prevent relative vertical movement of said side wheels with respect to said load carrying wheel.

14. Running gear for supporting a vehicle body for passage along a monobeam having top and side running surfaces comprising at least one load carrying wheel adapted to ride along said top running surface; a main carrier; means supporting said load carrying wheel on said main carrier for rotation about a predetermined axis; means mounting said main carrier on the vehicle body for pivotal movement about a substantially horizontal axis spaced from said predetermined axis whereby said load carrying wheel is supported for vertical movement with respect to said vehicle body; side wheels adapted to ride along said side running surfaces; additional carriers supporting said side wheels; means supporting said additional carriers on said vehicle body for movement laterally and vertically of said vehicle body; rigid means connecting said load carrying wheels and said side wheels, said rigid means preventing relative movement of all of said wheels in a vertical direction; and resilient means mounted on said vehicle body and connected to said wheels to yieldingly urge each of said wheels against the adjacent beam surfaces.

References Cited in the file of this patent

UNITED STATES PATENTS

| | | |
|---|---|---|
| 456,103 | Turner et al. | July 14, 1891 |
| 494,081 | Pruyn | Mar. 21, 1893 |
| 609,784 | Capewell | Aug. 30, 1898 |
| 609,785 | Capewell | Aug. 30, 1898 |
| 637,005 | Knudsen | Nov. 14, 1899 |
| 723,024 | Rees | Mar. 17, 1903 |
| 786,117 | Hagen | Mar. 28, 1905 |
| 801,832 | Abernathy | Oct. 17, 1905 |
| 1,043,793 | Barnes | Nov. 12, 1912 |
| 1,086,890 | Brown | Feb. 10, 1914 |
| 1,091,853 | Lewis | Mar. 31, 1914 |

FOREIGN PATENTS

| | | |
|---|---|---|
| 448,779 | France | Dec. 6, 1912 |
| 916,936 | Germany | Aug. 19, 1954 |
| 165,344 | Australia | Sept. 23, 1955 |
| 167,418 | Australia | Apr. 9, 1956 |
| 943,594 | Germany | May 24, 1956 |